United States Patent
Kamiyama et al.

(10) Patent No.: US 10,901,676 B2
(45) Date of Patent: Jan. 26, 2021

(54) APPLICATION EXTENSION TO LOCALIZED EXTERNAL DEVICES

(71) Applicant: International Business Machines Corporation, Armonk, NY (US)

(72) Inventors: Yoshiroh Kamiyama, Setagaya-ku (JP); Keiji Miura, Yamato (JP); Tomohiro Shimizu, Tokyo (JP); Shinya Onuma, Toyko (JP)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 16/274,274

(22) Filed: Feb. 13, 2019

(65) Prior Publication Data

US 2020/0257486 A1    Aug. 13, 2020

(51) Int. Cl.
G06F 3/14 (2006.01)
H04W 4/02 (2018.01)
H04L 29/08 (2006.01)

(52) U.S. Cl.
CPC ............ *G06F 3/1423* (2013.01); *H04L 67/02* (2013.01); *H04W 4/026* (2013.01)

(58) Field of Classification Search
CPC .................. G06F 3/1423–1446; G06F 3/1454
See application file for complete search history.

(56) References Cited

U.S. PATENT DOCUMENTS

| 10,079,963 | B1 * | 9/2018 | Liu | H04N 21/4524 |
| 2010/0079683 | A1 * | 4/2010 | Kobori | H04N 9/3129 |
| | | | | 348/744 |
| 2016/0077706 | A1 * | 3/2016 | Haggar | G06F 3/0482 |
| | | | | 715/754 |
| 2016/0092151 | A1 * | 3/2016 | Yasuda | H01J 49/0036 |
| | | | | 345/440 |
| 2016/0092152 | A1 | 3/2016 | Portugal et al. | |
| 2016/0093241 | A1 * | 3/2016 | Bastani | G06F 3/1446 |
| | | | | 345/690 |
| 2016/0224306 | A1 * | 8/2016 | Rycyna | G09G 3/32 |
| 2016/0343350 | A1 * | 11/2016 | Khoury | G09G 5/12 |
| 2017/0262247 | A1 * | 9/2017 | Yoganandan | G06T 7/90 |

FOREIGN PATENT DOCUMENTS

| EP | 2632130 B1 | 8/2013 |
| EP | 2750419 B1 | 7/2014 |
| JP | 2012003508 A | 1/2012 |
| JP | 2015012561 A | 1/2015 |

* cited by examiner

*Primary Examiner* — Laurence J Lee
(74) *Attorney, Agent, or Firm* — Randy E. Tejeda

(57) ABSTRACT

In an approach to extending an application on an external device, the present invention extends graphical elements associated with the application to external devices utilizing assigned roles based on device capabilities from a maintained device table. The present invention compares device capabilities with historical application utilization to determine roles and extends the application to the external device based on the determined roles.

22 Claims, 6 Drawing Sheets

APPLICATION EXTENSION TO LOCALIZED EXTERNAL DEVICES

BACKGROUND

The present invention relates generally to the field of user displays and more particularly to extending applications to localized devices.

The increasing growth and popularity of modern-day computing has dramatically influenced the need for multiple, concurrently running applications and views. Although the resolutions and pixels per inch (PPI) of corresponding monitors and displays have increased, the increased resolution and pixels do not alleviate the issue of screen overcrowding. Furthermore, the inclusion of multiple concurrent virtual desktops in numerous operating systems attempts to rectify the issues but falls short due to the need of seeing multiple applications without hiding content. Another ineffective solution is to add additional displays to create a multi-display system, allowing an application(s) to spread over multiple displays but many computing systems do not have the ability to incorporate multiple displays due to physical hardware constraints and operating system limitations.

Universal Plug and Play (UPnP) is a set of networking protocols that permits networked devices, such as personal computers, printers, Internet gateways, Wi-Fi access points, and mobile devices to seamlessly discover each other on a network and establish functional network services for data sharing, communications, and entertainment. UPnP is intended primarily for residential networks without enterprise-class devices. UPnP assumes the network runs internet protocol (IP) and then leverages hypertext transfer protocol (HTTP), simple object access protocol (SOAP), and extensible markup language (XML) on top of IP, in order to provide device/service description, actions, and data transfer. Device search requests and advertisements are supported by running HTTP on top of user datagram protocol (UDP) (e.g., port 1900) using multicast (HTTPMU). Responses to search requests are also sent over UDP but are instead sent using unicast (HTTPU). Conceptually, UPnP extends plug and play (a technology for dynamically attaching devices directly to a computer) to zero configuration networking for residential and small office/home office (SOHO) wireless networks. UPnP devices are "plug and play" in that, when connected to a network, they automatically establish working configurations with other devices.

Peer-to-peer (P2P) computing or networking is a distributed application architecture that partitions tasks or workloads between peers. Peers are equally privileged, equipotent participants in the application. Peers make a portion of their resources, such as processing power, disk storage, or network bandwidth, directly available to other network participants, without the need for central coordination by servers or stable hosts. Peers are both suppliers and consumers of resources, in contrast to the traditional client-server model in which the consumption and supply of resources is divided.

SUMMARY

A first aspect of the present invention discloses a method including one or more computer processors detecting one or more external devices. The one or more computer processors retrieve device information from a device table for the detected one or more external devices. The one or more computer processors determine one or more capabilities of the one or more external devices based on the device information. The one or more computer processors assign one or more roles to the one or more external devices based the determined device capabilities. The one or more computer processors extend one or more graphical elements to the one or more external devices based on the assigned role. Embodiments of the present invention utilize device tables to store historical application extensions and utilize device information retrieved from the device table to reduce the amount of time and system resources needed to extend an application.

A second aspect of the present invention discloses a computer program product including one or more computer readable storage device and program instructions stored on the one or more computer readable storage device. The stored program instructions include program instructions to detect one or more external devices. The stored program instructions include program instructions to retrieve device information from a device table for the detected one or more external devices. The stored program instructions include program instructions to determine one or more capabilities of the one or more external devices based on the device information. The stored program instructions include program instructions to assign one or more roles to the one or more external devices based the determined device capabilities. The stored program instructions include program instructions to extend one or more graphical elements to the one or more external devices based on the assigned role. Embodiments of the present invention utilize device tables to store historical application extensions and utilize device information retrieved from the device table to reduce the amount of time and system resources needed to extend an application.

A third aspect of the present invention discloses a computer system including one or more computer processors and one or more computer readable storage device, where the program instructions are stored on the one or more computer readable storage device for execution by at least one of the one or more computer processors. The stored program instructions include program instructions to detect one or more external devices. The stored program instructions include program instructions to retrieve device information from a device table for the detected one or more external devices. The stored program instructions include program instructions to determine one or more capabilities of the one or more external devices based on the device information. The stored program instructions include program instructions to assign one or more roles to the one or more external devices based the determined device capabilities. The stored program instructions include program instructions to extend one or more graphical elements to the one or more external devices based on the assigned role. Embodiments of the present invention utilize device tables to store historical application extensions and utilize device information retrieved from the device table to reduce the amount of time and system resources needed to extend an application.

Additionally, another aspect of the present invention discloses a method including one or more computer processors detecting one or more changes in the group consisting of device orientation and device location. The one or more computer processors, responsive to detecting changes in device orientation or device location, reassign one or more roles to the external devices. The one or more computer processors adjust the extended graphical elements based the role reassignment. Embodiments of the present invention automatically adjust future application extensions to external devices based on device changes, eliminating the need for user interaction, and reducing the amount of system resources needed to extend an application.

Additionally, another aspect of the present invention discloses a computer program product including one or more computer readable storage device and program instructions stored on the one or more readable storage device. The stored program instructions include program instructions to detect one or more changes in the group consisting of device orientation and device location. The stored program instructions include program instructions to, responsive to detecting changes in device orientation or device location, reassign one or more roles to the external devices. The stored program instructions include program instructions to adjust the extended graphical elements based the role reassignment. Embodiments of the present invention automatically adjust future application extensions to external devices based on device changes, eliminating the need for user interaction, and reducing the amount of system resources needed to extend an application.

Additionally, another aspect of the present invention discloses a computer system including one or more computer processors and one or more computer readable storage device, where the program instructions are stored on the one or more computer readable storage device for execution by at least one of the one or more computer processors. The stored program instructions include program instructions to detect one or more changes in the group consisting of device orientation and device location. The stored program instructions include program instructions to, responsive to detect changes in device orientation or device location, reassign one or more roles to the external devices. The stored program instructions include program instructions to adjust the extended graphical elements based the role reassignment. Embodiments of the present invention automatically adjust future application extensions to external devices based on device changes, eliminating the need for user interaction, and reducing the amount of system resources needed to extend an application.

DETAILED DESCRIPTION

When applications have multiple content windows or include multitudes of information on a single display, monitor, or view, users can become confused, disengaged, and distracted. Additionally, users may overlook or ignore important information especially when multiple dialog boxes or popups open behind active windows. Traditionally, the solution is to replace the display with a larger screen, greater resolution, and/or add more additional displays to allow greater screen "real estate". This solution is wholly impractical due to numerous computing devices the hardware capabilities to add an additional display or the native operating system capabilities to add additional displays.

Embodiments of the present invention recognize that user efficiency can be gained by extending an application to an external device thus utilizing the external device as an additional display. Embodiments of the present invention further recognize that system efficiency can be gained by reducing the number of instructions executed by the central processor unit (CPU) and graphical processing unit (GPU) by eliminating the need for devices to generate extended graphical elements and storing/utilizing a device table. Implementation of embodiments of the invention may take a variety of forms, and exemplary implementation details are discussed subsequently with reference to the Figures.

Figure 1:
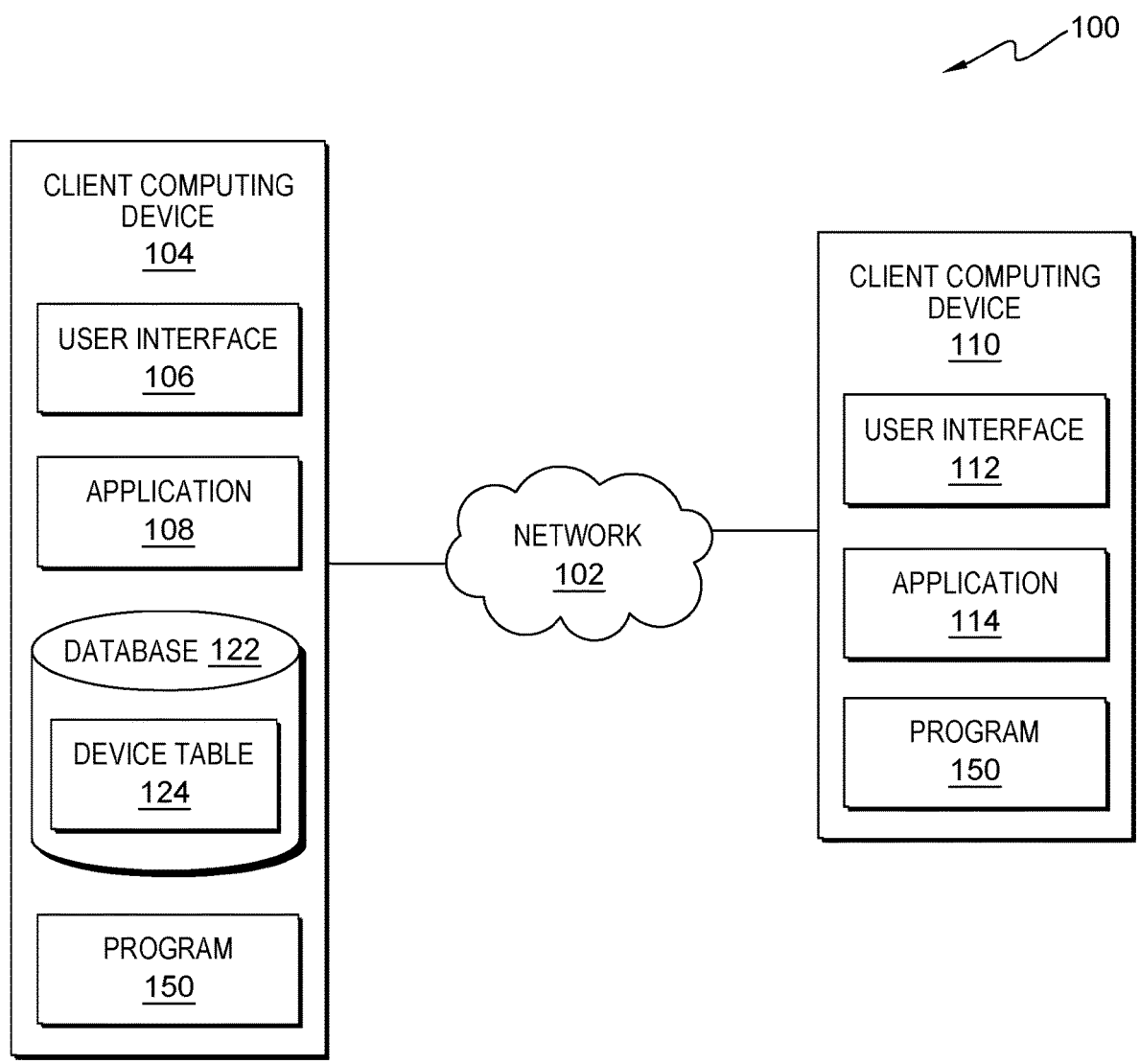
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and client computing device 110 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, client computing device 110, and other computing devices (not shown) within distributed data processing environment 100.

Client computing device 104 and client computing device 110 may each be a web server or any other electronic device or computing system capable of processing program instructions and receiving and sending data. In some embodiments, client computing device 104 and client computing device 110 may each be a laptop computer, a tablet computer, a netbook computer, a personal computer (PC), a desktop computer, a personal digital assistant (PDA), a smart phone, or any programmable electronic device capable of communicating with network 102. In other embodiments, client computing device 104 and client computing device 110 may each represent a server computing system utilizing multiple computers as a server system, such as in a cloud computing environment. In general, client computing device 104 and client computing device 110 are representative of any electronic device or combination of electronic devices capable of executing machine readable program instructions as described in greater detail with regard to FIG. 4, in accordance with embodiments of the present invention.

Client computing device 104 contains user interface 106, application 108, database 122, and program 150. Client computing device 110 contains user interface 112, application 114, and program 150. In other embodiments, client computing device 104 and client computing device 110 may contain other applications, databases, programs, etc. which have not been depicted in distributed data processing environment 100. Client computing device 104 and client computing device 110 may include internal and external hardware components, as depicted and described in further detail with respect to FIG. 4.

User interface 106 and user interface 112 may each be a program that provides an interface between a user of client computing device 104, client computing device 110, and a plurality of applications that reside on client computing device 104, client computing device 110 (e.g., application 108, application 114) and/or may be accessed over network 102. A user interface, such as user interface 106 and user interface 112, refers to the information (e.g., graphic, text, sound) that a program presents to a user and the control sequences the user employs to control the program. A variety of types of user interfaces exist. In one embodiment, user interface 106 and user interface 112 are graphical user interfaces. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements.

Application 108 and application 114 are a set of one of more programs designed to carry out the operations for a specific application to assist a user to perform an activity (e.g., word processing programs, spread sheet programs, media players, web browsers). In the depicted embodiment, application 108 and application 114 reside on client computing device 104 and client computing device 110 respectively. In another embodiment, application 108 and application 114 may reside on another computing device (not shown) connected over network 102.

Database 122 is a repository for data used by application 108, application 114, and program 150. In the depicted embodiment, database 122 resides on client computing device 104. In another embodiment, database 122 may reside on client computing device 110 or elsewhere within distributed data processing environment 100 provided application 108, application 114, and program 150 have access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as metadata associated with a specific user, application, device, and/or location. Additionally, database 122 may also store historical data associated with user responses to previously extended applications. In the depicted embodiment, database 122 includes device table 124.

Device table 124 contains device information based from historical application extensions. In an embodiment, device table 124 contains and maintains one or more entries of device information that include a plurality of information including, but not limited to, historical configurations, contexts, application metadata and information, device orientations (e.g., angular position relative to other devices, etc.), and device locations (e.g., geospatial, location relative to Earth, location relative to other devices (e.g., distance relative to other devices), etc.). For example, a historical configuration of a device includes the devices utilized, the assigned roles, and the extended application. In a further embodiment, said tables contain a plurality of metadata including, but is not limited to, device type, device performance capabilities (e.g., random access memory (RAM), central processing unit (CPU), graphics processing unit (GPU), network capabilities, etc.), display type, display resolution, display size, viewing angles, and aspect ratio. In another embodiment, said tables include application information which comprises a plurality of application metadata including, but not limited to, application identification, application category (e.g., word processing applications, spread sheet applications, media players, web browsers, etc.), application utilization (e.g., time utilized, duration utilized, etc.), and application device preferences.

Program 150 is a program for extending an application on an external device. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, program 150 may implement the following steps. The user logs into an application utilizing the primary device. Program 150 detects available external devices. Program 150 determines the capabilities for the detected device. In one embodiment, program 150 only utilizes one external device. In other embodiments, program 150 utilizes multiple external devices. Program 150 assigns a role to the external device based on the application utilized. Program 150 extends the application to the external device based on the assigned role. Program 150 is depicted and described in further detail with respect to FIG. 2.

Figure 2:
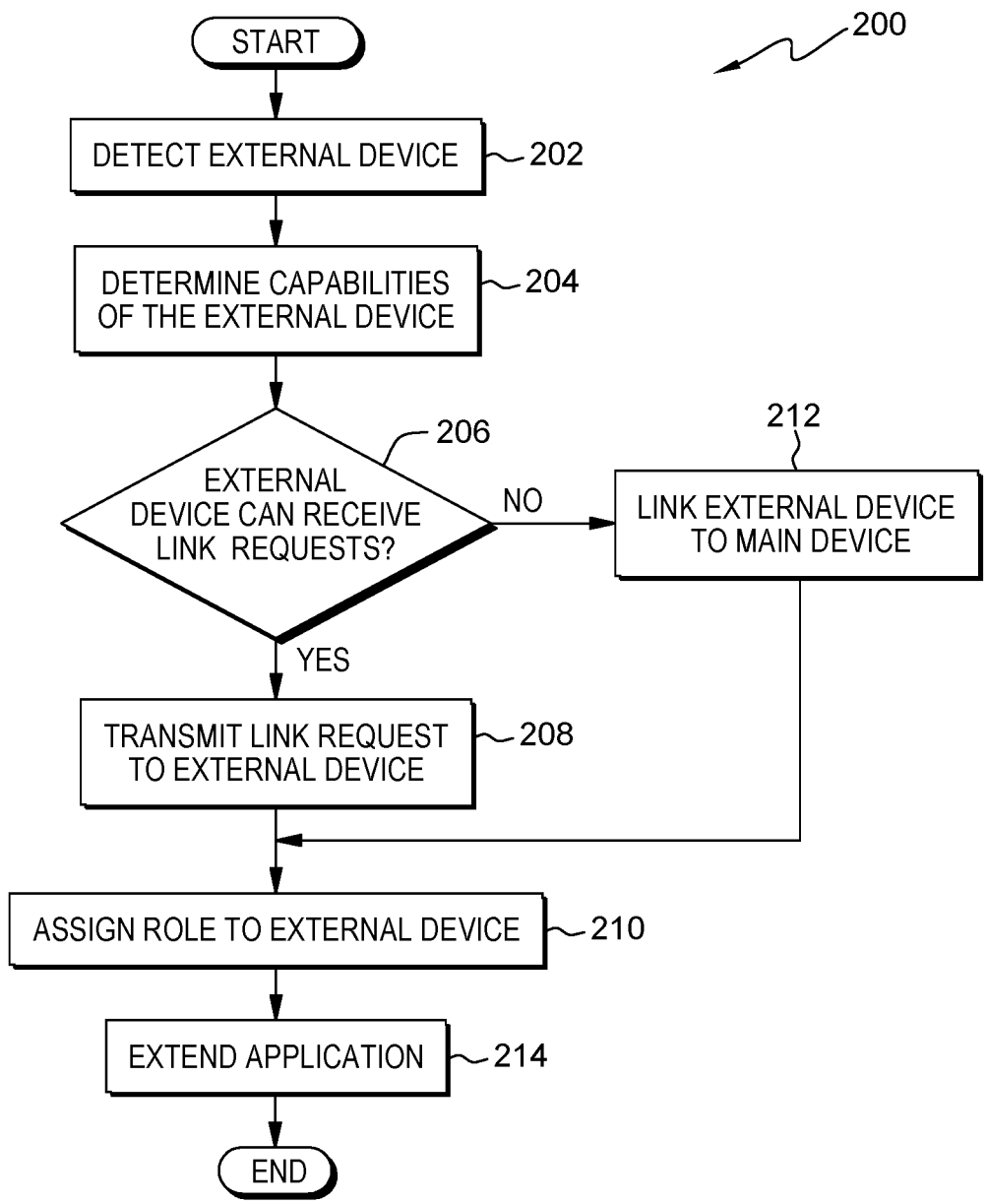
FIG. 2 is a flowchart depicting operational steps of an application extension program, on a client computing device within the data processing environment of FIG. 1, for extending an application on an external device, in accordance with an embodiment of the present invention.

FIG. 2 is a flowchart depicting operational steps of program 150 for extending an application on an external device, in accordance with an embodiment of the present invention.

Program 150 detects external devices (step 202). In an embodiment, program 150 initiates when a user initiates or logs into an application capable of being extended to an external device. An application capable of being extended may be any application that could benefit from an additional display. In an example situation, an application displays a table that allows a popup notification containing further information to appear when the user clicks on an individual cell. Responsive to the user logging in or starting an application, program 150 detects local external devices.

In an embodiment, program 150 can prompt a user associated with one or more local devices to determine whether the user authorizes program 150 to detect, access, and utilize any device peripherals or device metadata (e.g., device capabilities, device location, device orientation, etc.). In various embodiments, program 150 can detect and access a listing of allowed peripherals such as sensors, cameras, microphones, and camera-enabled/microphone-enabled devices that are registered with program 150 (i.e., have opted-in to providing information to program 150). In example embodiments, individuals can register a device, sensor, or camera with program 150 (e.g., an owner of a camera-enabled device permits program 150 to access and utilize a video feed and images from said camera). Accordingly, program 150 can determine whether a local device or peripheral is available by utilizing an approved listing of cameras, microphones, and devices. For example, program 150 determines that client computing device 104 includes an available camera and program 150 sends a prompt the user utilizing client computing device 104, requesting approval to access and utilize a video feed of the camera to determine the proximate locations of any nearby local devices.

In an embodiment, program 150 utilizes universal plug and play (UPnP) networking protocols to discover the presence of external devices. In a further embodiment, program 150 constrains UPnP to a local network subnet in order to confine program 150 to detecting just local external devices. In another embodiment, program 150 detects local external devices by detecting one or more internet protocol (IP) addresses on the same subnet as the host operating system (OS) that includes program 150. In yet another embodiment, the user inputs the IP address of the external device into program 150 utilizing user interface 106. For example, if the user knows that IP address of the external device is 10.10.10.50, then the user may input said IP address into program 150. In various embodiments, program 150 allows external devices to connect directly to program 150 utilizing peer to peer networking (P2P).

In an embodiment, program 150 utilizes a packet sniffer to intercept and log traffic passing over a network. In this embodiment, program 150 captures local packets that are detected over the network. These captured packets may contain device and application identification information such as a unique device identifier. In a further embodiment, program 150 utilizes a wireless sniffer to detect external devices over wireless networks. In yet another embodiment, program 150 sends a ping to every address on the network. For example, if program 150 exists in a 192.168.1.0/24 subnet, then program 150 pings each address between 192.168.1.0 to 192.168.1.255. In various embodiments, program 150 utilizes multicast to broadcast to every device on the network. For example, an external device may transmit an acknowledgement (ACK) packet to the primary device, notifying the primary device that an external device is present and available for extension. In a further embodiment, the ACK packet contains further device information such as an IP address, device identification, etc.

In an embodiment, program 150 utilizes image/object recognition techniques (i.e., edge matching, divide-and-conquer search, greyscale matching, gradient matching, etc.) to detect local devices. In this embodiment, program 150 utilizes a camera (not depicted) on the primary device (e.g., client computing device 104) to capture and process images associated with external devices located within the surrounding environment of the primary device. For example, the user has a tablet device located on the left side of the primary device, which program 150 detects and identifies by utilizing a webcam connected to the primary device. In this example, program 150 identifies the location of the device relative to the primary device and identifies the specifications of the device. In another embodiment, program 150 transmits specific sound waves (e.g., ultrasonic, etc.) from a speaker (not depicted) attached to the primary device, to detect local devices. In this embodiment, localized external devices with microphones (not depicted) detect the specific transmitted sound and respond to the primary device. In this embodiment, the sound may be encoded with device/application information such as the IP address of the primary device. For example, the primary device transmits a specific sound wave, encoded with an IP address, that is detected by the external device, prompting the external device to connect to the primary device with the decoded IP address. Also, the transmitted sounds are confined to the immediate surroundings of the primary device thus guaranteeing that only local capable external devices will receive the sound and thus be detected.

In the depicted embodiment, program 150 queries device table 124 for the detected and identified device. In this embodiment, if program 150 determines that the detected device is not present in device table 124, then program 150 may create a new table entry that includes a plurality of information such as identified device information, method of detection (e.g., network protocol, IP address, port number, etc.). In other embodiments, the table entry includes image recognition information such as an image of the device in an original format or in a converted greyscale format.

Program 150 determines capabilities of the external device (step 204). Responsive to program 150 detecting external devices, program 150 determines the capabilities of the detected devices. In an embodiment, the capabilities include, but are not limited to, device type, device performance capabilities (e.g., random access memory (RAM), central processing unit (CPU), graphics processing unit (GPU), network capabilities, etc.), display type, display resolution, display size, viewing angles, and aspect ratio. In an embodiment, program 150 determines device capabilities by pinging and polling every detected external device. For example, an external device responds with device identification information, which may include capability parameters, to program 150 after a successful ping request. In another embodiment, program 150 identifies the external device utilizing a unique product identifier, manufacturer part number, and/or part number. In a further embodiment, program 150 retrieves the technical specification of the identified external device from a plurality of sources including, but not limited to, a manufacturer or third-party website/repository. In another embodiment, program 150 utilizes a reverse image search to determine the capabilities of the identified device based on the captured image of the device as detailed in step 202. In various embodiments, the user inputs the capabilities of the external device into program 150. For example, if the user knows that the device is capable of high definition video output and gigabyte networking speeds, then the user inputs said capabilities into program 150 utilizing user interface 106. In various embodiments, program 150 stores any determined capabilities to device table 124.

Program 150 may determine the orientation and/or location of the external device (e.g., client computing device 110, etc.) relative to the primary device (e.g., client computing device 104, etc.). In an embodiment, program 150 utilizes sensors (not depicted) to determine the orientations and locations of each device relative to each other. In a further embodiment, program utilizes proximity sensors (not depicted) located in each device to determine said locations. For example, program 150 utilizing proximity sensors located within the primary device and external device to determine that the external device is located to the left of the primary device and that the devices are within a 4 feet radius of each other. In yet another embodiment, program 150 utilizes orientation sensors, such as an accelerometer (not depicted) to determine the orientation the device. In another embodiment, program 150 determines the distance between the devices. For example, an external device located to the left of the primary device is determined to be 3 feet away from the primary device.

In various embodiments, accelerometers (not depicted), located on the external device are able to detect orientation, coordinate acceleration, vibration, and shock. In an example, said accelerometers are capable determining changes in 6-axis: X (forward/back, surge), Y (left/right, sway), Z (up/down, heave), yaw, pitch, and roll. In an embodiment, program 150 calculates a change in device orientation and location by determining axis changes due to device movement. In various embodiments, program 150 actively polls and monitors the sensors for changes to the location and/or orientation. In this embodiment, program 150 can dynamically change (e.g., remove elements/roles, add elements, reassign roles, etc.) the extended application to reconcile with changes in orientation or location. For example, if program 150 extended a list panel to the external device in vertical orientation but later the external device is rotated 90 degrees to a horizontal orientation, then program 150 detects this change and modifies the extended application to conform with the change. In this example, program 150 may increase or decrease the amount of information displayed based on the orientation and/or location change. In another embodiment, program 150 reassigns the previously assigned device role based on one or more detected changes in device orientation and/or location.

In yet another embodiment, program 150 determines whether the external device is capable of receiving link requests based on a plurality of device factors including, but not limited to, device capabilities (i.e., performance capabilities, network capabilities, display capabilities, user interface capabilities), device location, device orientation, and device operating system capabilities. In this embodiment, program 150 determines whether these device factors are present and, subsequently, the parameters of each present factor. For example, if program 150 cannot determine the device location, then program 150 determines that a link request cannot be transmitted. In another example, if program 150 cannot access the device over the network and/or the device does not have adequate networking capabilities or permissions then program 150 determines that said device is not capable of receiving link requests. In some embodiments, program 150 may transmit the link request to the external device using a plurality of transmission methods including, but not limited to, wireless network, ethernet network, virtual private network (VPN), short message service (SMS), email, push notification, etc. In some embodiments, program 150 creates ad hoc networks to connect with external devices. In various embodiment, program 150 stores determined device orientations, locations, and link (e.g., network) capabilities within device table 124.

If program 150 determines that the external device can receive link requests ("Yes" branch, decision block 206), then program 150 transmits a link request to the external device (step 208). In various embodiments, the link request contains a plurality of host information including, but is not limited to, the IP address of the requesting device (i.e., client computing device 104), the hostname of the requesting device, the user of the requesting device, the identification of the operating system of the requesting device, network ports, and preferred networks (wireless, ethernet, radio waves, subnets, domains, VPN, proxies, etc.). In another embodiment, the link request contains a plurality of application information including, but is not limited to, the name of the extending application, the generalized purpose of the application, required security permissions, available roles, adjustable user interface elements (i.e., side panels, dialog boxes, pop-up notifications, menus, etc.), and minimum device requirements.

In an embodiment, the link request contains a notification displayed on a user interface (i.e., user interface 112) on the external device alerting the user of the application extension. For example, responsive to receiving the link request, a pop-up notification is displayed notifying the user. In a further embodiment, the notification contains aspects of host information and application information as described above. For example, the notification includes the IP address/hostname of the requesting device, the application name, and suggested device roles. In various embodiments, the link request contains a dialog prompt requesting user identification and/or permission utilizing various security measures such as a username, password, pin, thumbprint, face scan, and/or iris scan. For example, before extending an application, program 150 requests that the user input a correct username and password. In another embodiment, the external device responds to the link request with additional information such as the IP address of the external device (i.e., client computing device 110), additional technical, or performance capabilities. In an embodiment, the link request grants root access to the operating system of the external device allowing program 150 access to system calls, functions, settings, and associated programs. For example, responsive to logging in through a username/password dialog prompt, program 150 is granted root access on the external device. In this example, program 150 has complete access to the graphical and user interface system properties granting program 150 the ability to manipulate graphical elements. In various embodiments, program 150 creates a VPN connection or an encrypted channel (i.e., secure sockets layer (SSL), secure shell (SSH), etc.) between the primary device and the external device. In an embodiment, link request information such as IP addresses, performance capabilities, associated programs, and associated device information are stored and retrieved from device table 124.

Program 150 assigns a role to the external device (step 210). Roles associate one or more graphical elements (side panels, lists, tables, notifications, pop-ups, dialog boxes, forms, charts, etc.) of an application to an external device. For example, responsive to the user clicking or touching an item in a list of items on the primary device, program 150 reproduces a dialog box on the external device displaying additional details regarding the clicked item. In various embodiments, program utilizes a plurality of roles including, but not limited to, right side role (extend a right side pane), left side role (extend a left side pane), dialog role (extend a dialog box), table role (extend a table), lens role (magnifying and extends portions of the application), properties role (extends properties of a selected element), and log/status role (extends the log view of an application). Several of the delineated roles are further detailed in FIG. 3. In an embodiment, the user manually assigns a preferred role for the external device. In a further embodiment, program 150 prompts the user with a list of available roles. For example, the user designates the role of the external device to display any pop-up notifications that may appear on the primary device (i.e., client computing device 104). In another embodiment, program 150 assigns a role based on retrieved historical application usage, associated roles, and associated external devices from device table 124. In this embodiment, program 150 assigns roles based on previous configurations, frequency of use, and user feedback. For example, if the user only utilizes one role while using a spreadsheet application, then program 150 associates said role with said application. In another example, program 150 retrieves associated device, user, and application information from device table 124 which demonstrates that the user frequently utilizes a dialog role when the external device is located to the right of the primary device and when the external device is located to the left, program 150 utilizes a left panel role. In this example, program 150 associates the retrieved information from device table 124 to identify frequently used roles to the associated relative locations and orientations with the application and the devices utilized.

Program 150 may determine roles based on a plurality of factors including, but not limited to, primary and external device locations and orientations, primary and external device capabilities, historical application and device configurations, available graphical elements, etc. In the depicted embodiment, program 150 utilizes device table 124 which contains the previously described role determination factors on a device to device and application to application basis. In various embodiments, program 150 compares the determined capabilities with historical capabilities retrieved from device table 124. In another embodiment, program 150 compares the currently utilized application with historical applications. In yet another embodiment, determines what roles were associated with the historical capabilities and the historical applications. In the depicted embodiment, program 150 utilizes the determined and compared capabilities, applications, and roles to determine which role to assign the device. For example, if the current device is utilizing the same application as an historical device table entry and the device has comparable capabilities as the historical device, then program 150 assigns the same historical role to the current device. In a further embodiment, program 150 may combine multiple device table entries to determine a role for a new external device.

In an embodiment, roles are determined by a plurality of factors and triggers including, but are not limited to, orientation triggers, location triggers, application triggers, user triggers, and graphical element blacklist. Orientation triggers are roles that are assigned when the primary and external devices are rotated to specific relative angle. For example, when the user orients the external device in a vertical orientation, the role of the external device switches to a list role where a list is reproduced on the external device. In this example, responsive to user clicking on an item in the list on the external device, program 150 changes the content on the primary device based on the selected item. Location triggers are roles that are assigned when the user adjusts the relative locations of the primary and external devices or when the user adjusts the geospatial location of a device. In an example situation, the user moves the external device, located to the bottom of the primary device, to the right of the primary device activating a location trigger. In this example situation, program 150 assigns a right panel role that removes the right panel from the UI of the primary device and reproduces the right panel on the external device. User triggers are roles that are assigned when a specific user utilizes the devices. In an embodiment, program 150 associates frequently used roles and associated applications with a specific user, storing, and retrieving said role information from device table 124, allowing program 150 to automatically assign that role responsive to the user initiating said application. Graphical element blacklist consists of applications and/or user specified graphic elements that program 150 is precluded from extending, adjusting, and/or removing. For example, the user adds a banner panel to the blacklist, preventing program 150 from reproducing and/or adjusting the banner panel on any device. In an embodiment, program 150 stores and retrieves the blacklists from device table 124.

In various embodiments, roles, applications, and devices may utilize combinations of multiple triggers. For example, a specific device may have multiple orientation triggers based on the angle of rotation, relative distance, application type, etc. In addition, the device may have multiple triggers. In a further embodiment, the triggers are assigned numerical weights and ranked to create a hierarchy of triggers. The weights may be determined by the application, device, or manually by the user. For example, the user inputs that an external device associated with a word processing application must rely on the location of the external device relative to the location of the primary device when determining what role to assign to the external device. In this example, the user can further dictate what secondary factors to utilize such as available graphical elements, distance between the devices, etc. In various embodiments, trigger details and information are stored and retrieved from device table 124.

In an embodiment, program 150 mirrors the graphical elements on the primary device. For example, if the primary device is running a spreadsheet application, the external device reproduces the graphical elements of said application. In a further embodiment, responsive to the user clicking/selecting one or more graphical elements on a mirrored, extended application, program 150 removes any graphical elements that have not been selected on the external device. In an example scenario, a spreadsheet application contains several graphical elements that include a table, a side panel, and a top navigation bar. In this scenario, the user selects on the side panel on the external device then program 150 removes the table and top navigation bar from the external device. In another embodiment, responsive to the user clicking one or more graphical elements on a mirrored, extended application, program 150 removes said graphical elements on the primary device and reproduces the graphical elements on the external device. Continuing from the previous example situation, program 150 removes the side panel from the primary device and reproduces the side panel on the external device.

If program 150 determines that the external device cannot receive link requests ("No" branch, decision block 206), then program 150 links the external device to the primary device (step 212). In this step, the primary device is unable to detect and/or identify the external device. In an embodiment, the user may input the IP address, hostname, and/or listening port of the primary device in order to initiate the connection. In this embodiment, a link request, as discussed in step 208, is transmitted to the primary device from the external device. As discussed above, the link request may contain information regarding the capabilities of the transmitting (requesting) device. In another embodiment, program 150 requires that the user provide user identity verification, as discussed in step 208, in order to transmit the link request. In another embodiment, the link request contains instructions for an application to run on the primary device. For example, the user selects an option to initiate a spreadsheet application on the primary device and automatically extend said application to the external device. In yet another embodiment, program 150 prompts the user with a list of available applications located on the primary device. In various embodiments, the link request contains requested role from the external device. In this embodiment, program 150 determines whether to accept or deny the request based on the application running/requested, primary and external device capabilities, and available graphical elements. For example, the user requests that the primary device initiate a word processor application with the external device assigned to a top menu role where the top menu of the application is reproduced on the external device.

Program 150 extends application (step 214). Program 150 reproduces the application extension graphical element on the display on the external device. In an embodiment, program 150 integrates with the application to remove the graphical element from the display of the primary device and reproduce the graphical element on the external device. For example, if a right side panel is being extended to the external display, then program 150 removes the right side panel from the primary device and reproduces the right side panel on the external display. In an embodiment, program 150 analyzes the web code (hypertext markup language (HTML), cascading style sheets (CSS), JavaScript, etc.) of the application to identify. For example, program 150 analyzes the CSS code of a web application to identify the navigation bar. In this example, program 150 removes said CSS code and reproduces the code on the external device.

In an embodiment, program 150 hooks into the application to intercept function calls, messages, and events. In this embodiment, program 150 is able to manipulate the behavior and adjust the graphical elements of the application. For example, program 150 halts until the application calls for a render of a specific graphical element on the primary device. In this example, when program 150 intercepts the call, program 150 blocks the call and transfers the graphical to the external device for reproduction. In a further embodiment, program 150 hooks into the operating systems of the respective host devices (e.g., client computing device 104, client computing device 110, etc.). In this embodiment, program 150 manipulates the graphical capabilities of the host devices to remove and add graphical elements. In another embodiment, program 150 utilizes low level programming (e.g., C, assembly, machine code, etc.) to alter and control operating system processes and instructions such as GPU instructions and graphic application programming interface (API) calls.

In various embodiments, program 150 identifies the pixels used by a graphical element. In this embodiment, program 150 may utilize the graphic capabilities to block out the identified pixels on a device in order to remove the graphical element. For example, program 150 identifies that the graphical element is to be rendered in pixels 300-600 in the x-axis and pixels 250-350 in the y-axis. In an embodiment, the identified pixel information is stored within device table 124 along with any association user, device, or application metadata. Continuing from the previous example, program 150 blocks out the identified pixels, utilizing the aspect ratio of the external devices transforms, and reproduces said pixels on the external display. In various embodiments, program 150 transfers all user interface interaction such as mouse movement, mouse clicks, touchpad activity, etc. to the primary device for processing. For example, if the user clicks on a list item on a list that was extended from the primary device, then program 150 transfers the click to the primary device so that the application on the primary device reacts as though the list item was clicked on the primary device.

In various embodiments, program 150 continues to monitor the primary device and the external devices for changes in orientation and/or location. For example, if the user rotates the external device from a horizontal orientation to a vertical orientation, then program 150 may reassign the role of the external device. In this example, if program 150 reassigns the role, then the graphical elements determined by the role are replaced by the graphical elements of the reassigned role. In an embodiment, program 150 logs the utilized application information, host information, and external device information into device table 124. In a further embodiment, the utilized application information is associated with the roles assigned to the external device.

Figure 3A:
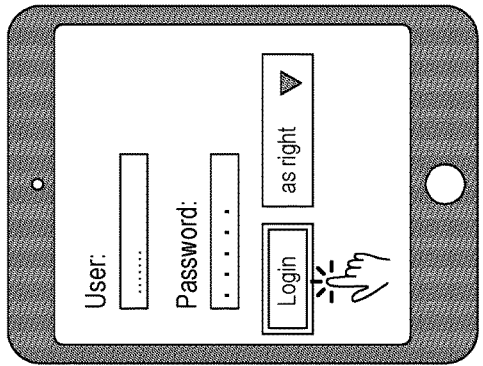
FIG. 3A depicts an example illustration of a side panel extension, in accordance with an embodiment of the present invention.
Figure 3A:
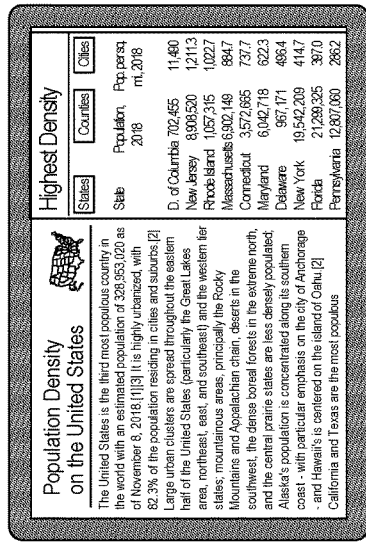
Figure 3A:
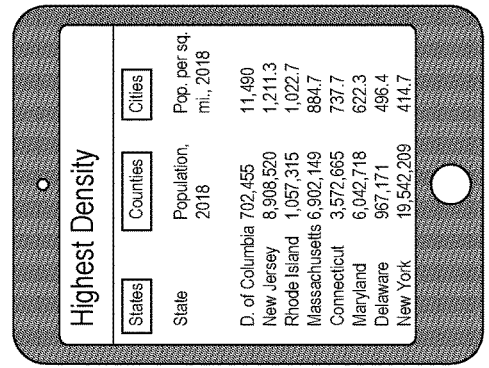
Figure 3A:
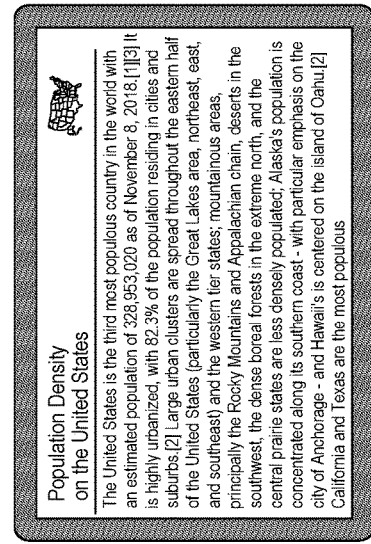

FIG. 3A depicts example application extension 300A, which is an example illustration of program 150 extending an application that contains a side panel to an external device. Example application extension 300A includes a primary device along with an external device situated to the right of the primary device. The external device includes a login prompt which initiates the application extension process (e.g., the right panel on the primary device is removed and replicated on the external device).

Figure 3B:
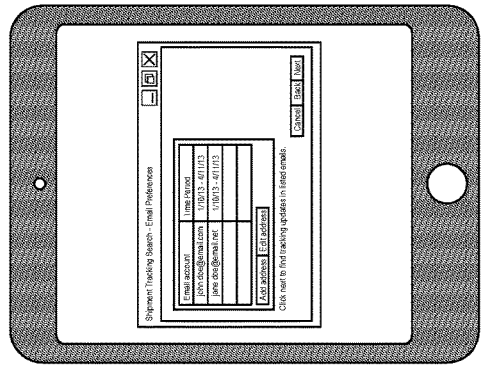
FIG. 3B depicts an example illustration of a dialog role extension, in accordance with an embodiment of the present invention.
Figure 3B:
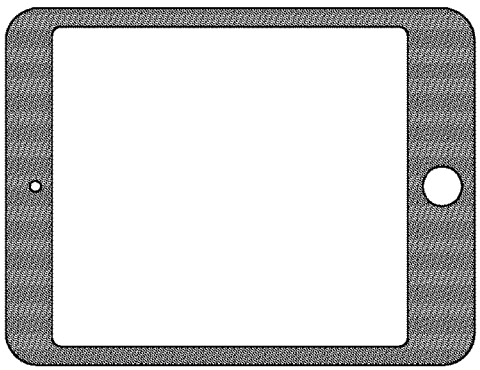
Figure 3B:
Figure 3B:
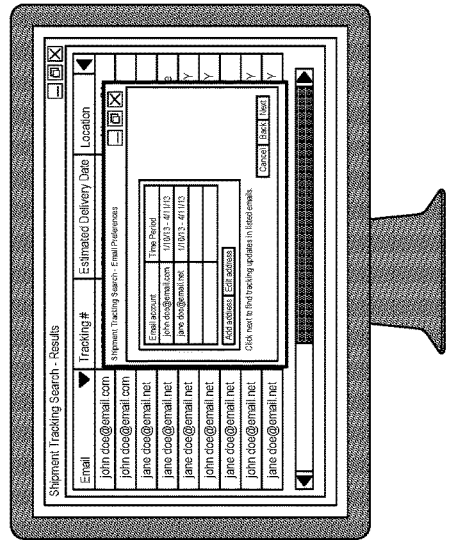

FIG. 3B depicts example application extension 300B, which is an example illustration of program 150 extending an application that contains a dialog panel to an external device. Example application extension 300B includes a primary device along with an external device situated to the right of the primary device. The primary device initiates the application extension process (e.g., the overlapping dialog panel on the primary device is removed and replicated on the external device).

Figure 3C:
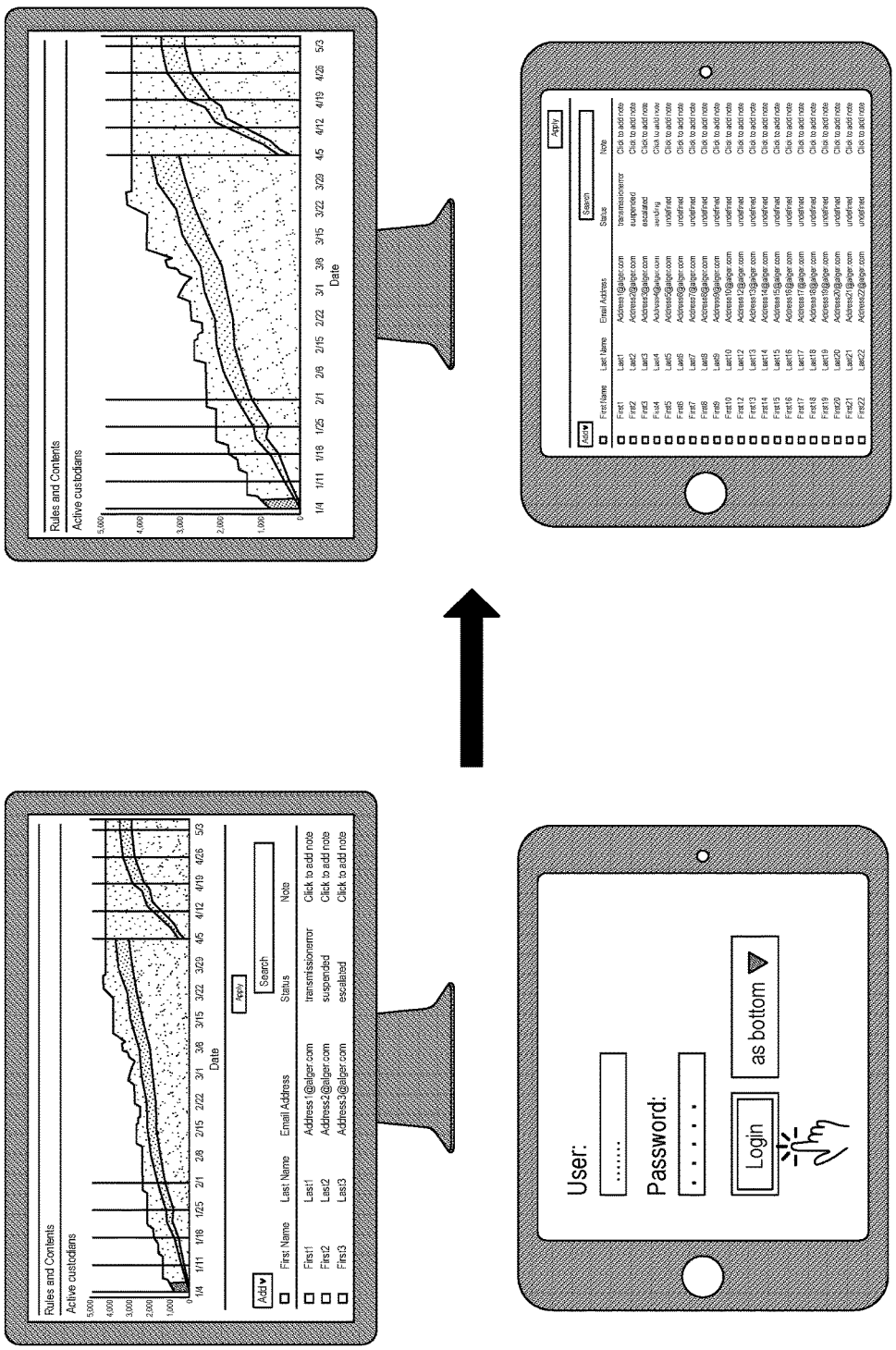
FIG. 3C depicts an example illustration of a bottom panel role extension, in accordance with an embodiment of the present invention.

FIG. 3C depicts example application extension 300C, which is an example illustration of program 150 extending an application that contains a dialog panel to an external device. Example application extension 300C includes a primary device along with an external device situated to the bottom of the primary device. The external device includes a login prompt which initiates the application extension process (e.g., the bottom panel on the primary device is removed and replicated on the external device).

Figure 4:
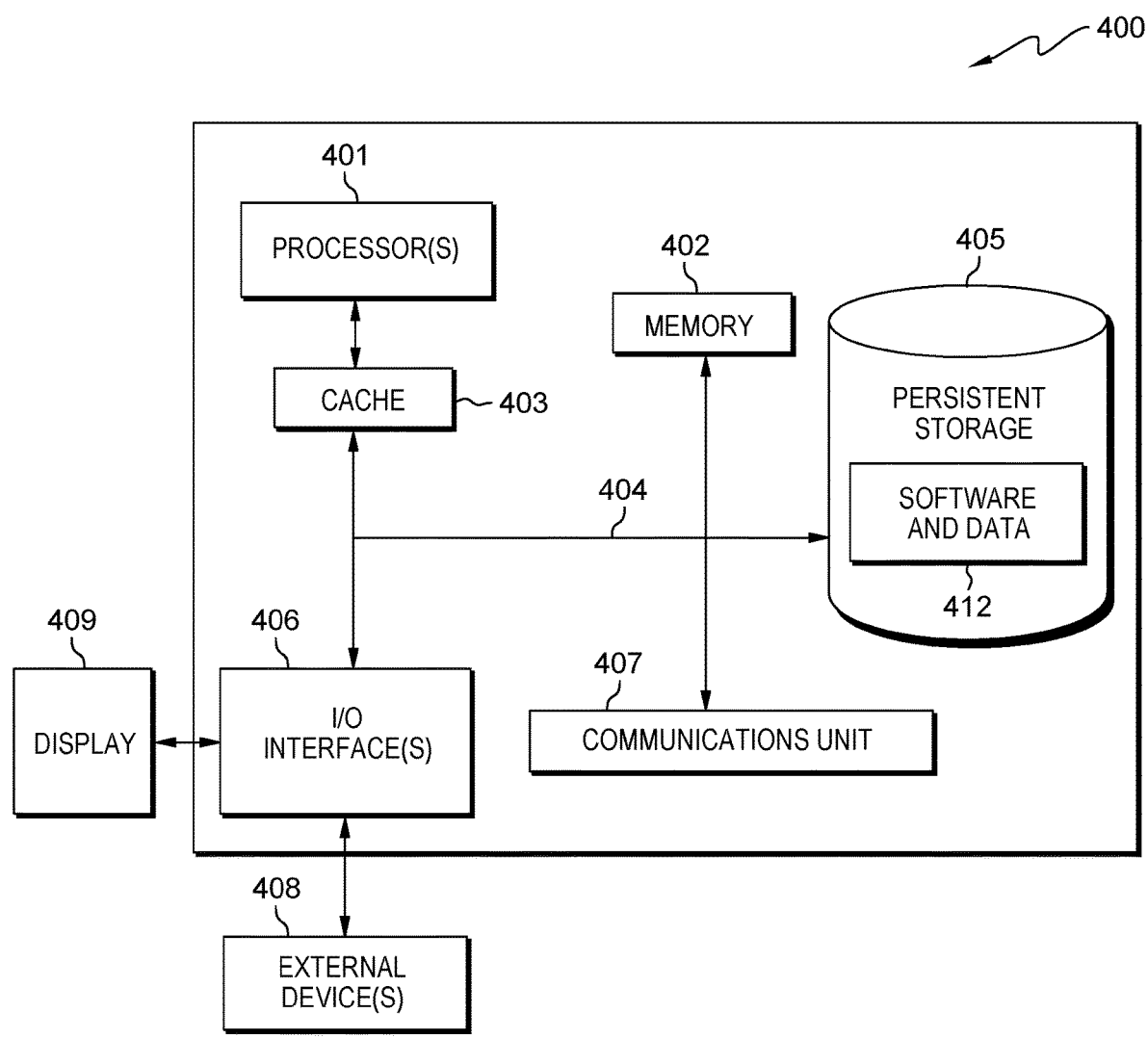
FIG. 4 is a block diagram of components of the client computing device executing the application extension program, in accordance with an embodiment of the present invention.

FIG. 4 depicts a block diagram of components of client computing device 104 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computing device 104 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to client computing device 104. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more computer processors, one or more capabilities of one or more detected external devices;
   assigning, by one or more computer processors, one or more roles to the one or more external devices based on the determined device capabilities, wherein assigning further comprises:
      comparing, by one or more computer processors, the determined device capabilities with historical device capabilities from a device table;
      comparing, by one or more computer processors, a currently utilized application with historical application utilization;
      determining, by one or more computer processors, a role based on the comparison of device capabilities and historical application utilization; and
   extending, by one or more computer processors, one or more graphical elements to the one or more external devices based on the assigned determined role.

2. The method of claim 1, wherein determining one or more capabilities of the one or more external devices, further comprises:
   determining, by one or more computer processors, one or more orientations of the devices wherein orientation includes angular orientation relative to other devices;
   determining, by one or more computer processors, one or more locations of the devices wherein location includes geospatial location and position relative to other devices; and
   calculating, by one or more computer processors, distances between the devices.

3. The method of claim 1, wherein extending one or more graphical elements to the one or more external devices based on the assigned role, further comprises transmitting, by one or more computer processors, a link request to the one or more external devices.

4. The method of claim 3, wherein the link request includes information selected from the group consisting of: device network address, device assigned role, device ports, and identified graphical elements.

5. The method of claim 1, wherein device information from a device table includes information selected from the group consisting of: device network information, historically assigned roles, historically replicated graphical elements, historical device orientations, historical device locations, and historically utilized applications.

6. The method of claim 1, wherein extending one or more graphical elements to the one or more external devices based on the assigned role, further comprises:
   identifying, by one or more computer processors, one or more graphical elements associated with an application;
   determining, by one or more computer processors, the identified graphical elements to extend to the one or more external devices based on the assigned role; and
   extending, by one or more computer processors, the determined graphical elements to the one or more external devices.

7. The method of claim 1, wherein extending one or more graphical elements to the one or more external devices based on the assigned role, further comprises:
   identifying, by one or more computer processors, pixels associated with the graphical elements on a primary device;
   removing, by one or more computer processors, the identified pixels associated with the graphical elements on a primary device; and
   reproducing, by one or more computer processors, the identified pixels on the external device.

8. The method of claim 1, further comprising:
   detecting, by one or more computer processors, one or more changes in the group consisting of device orientation and device location;
   responsive to detecting changes in device orientation or device location, reassigning, by one or more computer processors, one or more roles to the external devices; and
   adjusting, by one or more computer processors, the extended graphical elements based on the role reassignment.

9. A computer program product comprising:
   one or more computer readable storage media and program instructions stored on the one or more computer readable storage media, the stored program instructions comprising instructions to cause one or more executing processors to:

determine one or more capabilities of one or more external devices;

assign one or more roles to the one or more external devices based on the determined device capabilities, wherein assign further comprises:

compare the determined device capabilities with historical device capabilities from a device table;

compare a currently utilized application with historical application utilization;

determine a role based on the comparison of device capabilities and historical application utilization; and extend one or more graphical elements to the one or more external devices based on the assigned determined role.

10. The computer program product of claim 9, wherein determining one or more capabilities of the one or more external devices, further comprises instructions to cause one or more executing processors to:

determine one or more orientations of the devices wherein orientation includes angular orientation relative to other devices;

determine one or more locations of the devices wherein location includes geospatial location and position relative to other devices; and calculate distances between the devices.

11. The computer program product of claim 9, wherein extending one or more graphical elements to the one or more external devices based on the assigned role, further comprises instructions to cause one or more executing processors to transmit a link request to the detected external devices.

12. The computer program product of claim 11, wherein the link request includes information selected from the group consisting of: device network address, device assigned role, utilized application, device ports, device capabilities, and identified graphical elements.

13. The computer program product of claim 9, wherein extending one or more graphical elements to the one or more external devices based on the assigned role, further comprises instructions to cause one or more executing processors to:

identify one or more graphical elements associated with an application;

determine the graphical elements to extend to the one or more external devices based on the assigned role; and extend the identified graphical elements to extend to the one or more external devices based on the assigned role.

14. The computer program product of claim 9, wherein extending one or more graphical elements to the one or more external devices based on the assigned role, further comprises instructions to cause one or more executing processors to:

identify the pixels associated with the graphical elements on a primary device;

remove the identified pixels associated with the graphical elements on a primary device; and reproduce the identified pixels on the external device.

15. The computer program product of claim 9, further comprising instructions to cause one or more executing processors to:

detect one or more changes in the group consisting of device orientation and device location;

responsive to detecting changes in device orientation or device location, reassign one or more roles to the external devices; and adjust the extended graphical elements based on the role reassignment.

16. A computer system comprising:

one or more computer processors;

one or more computer readable storage media; and program instructions stored on the computer readable storage media for execution by at least one of the one or more processors, the stored program instructions comprising:

program instructions to determine one or more capabilities of one or more external devices;

program instructions to assign one or more roles to the one or more external devices based on the determined device capabilities, wherein assign further comprises:

program instructions to compare the determined device capabilities with historical device capabilities from a device table;

program instructions to compare a currently utilized application with historical application utilization;

program instructions to determine a role based on the comparison of device capabilities and historical application utilization; and program instructions to extend one or more graphical elements to the one or more external devices based on the assigned determined role.

17. The computer system of claim 16, wherein determining one or more capabilities of the one or more external devices, further comprises program instructions to:

determine one or more orientations of the devices wherein orientation includes angular orientation relative to other devices;

determine one or more locations of the devices wherein location includes geospatial location and position relative to other devices; and calculate distances between the devices.

18. The computer system of claim 16, wherein extending one or more graphical elements to the one or more external devices based on the assigned role, further comprises program instructions to transmit a link request to the detected external devices.

19. The computer system of claim 18, wherein the link request includes information selected from the group consisting of: device network address, device assigned role, utilized application, device ports, device capabilities, and identified graphical elements.

20. The computer system of claim 16, wherein extending one or more graphical elements to the one or more external devices based on the assigned role, further comprises program instructions to:

identify one or more graphical elements associated with an application;

determine the graphical elements to extend to the one or more external devices based on the assigned role; and extend the identified graphical elements to extend to the one or more external devices based on the assigned role.

21. The computer system of claim 16, wherein extending one or more graphical elements to the one or more external devices based on the assigned role, further comprises program instructions to:

identify the pixels associated with the graphical elements on a primary device;

remove the identified pixels associated with the graphical elements on a primary device; and reproduce the identified pixels on the external device.

22. The computer system of claim 16, further comprising program instructions to:

detect one or more changes in the group consisting of device orientation and device location;

responsive to detecting changes in device orientation or device location, reassign one or more roles to the external devices; and adjust the extended graphical elements based on the role reassignment.

\* \* \* \* \*